United States Patent [19]
Gibbemeyer

[11] Patent Number: 5,292,243
[45] Date of Patent: Mar. 8, 1994

[54] APPARATUS FOR HEATING PORTIONS OF CONTAINER PREFORMS

[75] Inventor: Joseph F. Gibbemeyer, Cincinnati, Ohio

[73] Assignee: Cincinnati Milacron Inc., Cincinnati, Ohio

[21] Appl. No.: 952,231

[22] Filed: Sep. 28, 1992

[51] Int. Cl.$^5$ .............................. B29C 49/64
[52] U.S. Cl. ..................... 425/526; 425/534; 432/11; 432/124
[58] Field of Search .................. 425/526, 534; 432/9, 432/11, 124

[56] References Cited

U.S. PATENT DOCUMENTS

| | | | |
|---|---|---|---|
| 3,775,524 | 11/1973 | Seefluth | 264/327 X |
| 3,865,912 | 2/1975 | Rosenkranz et al. | 425/145 |
| 3,892,830 | 7/1975 | Hudson et al. | 264/327 X |
| 3,950,459 | 4/1976 | Seefluth | 432/11 X |
| 4,076,071 | 2/1978 | Rosenkranz et al. | 425/393 |
| 4,342,895 | 8/1982 | Krisknakumar et al. | 264/535 X |
| 4,382,760 | 5/1983 | Wiatt et al. | 425/526 X |
| 4,571,173 | 2/1986 | Chang et al. | 432/9 |
| 4,606,723 | 8/1986 | Pasternicki | 425/526 X |
| 4,657,502 | 4/1987 | Rydmann | 425/526 |
| 4,678,425 | 7/1987 | Gibbemeyer | 425/534 X |
| 4,943,228 | 7/1990 | Reymann et al. | 425/526 |
| 5,017,126 | 5/1991 | Yamada et al. | 425/526 |
| 5,035,603 | 7/1991 | Unterlander et al. | 425/526 X |

Primary Examiner—Richard L. Chiesa
Attorney, Agent, or Firm—Stephen H. Friskney

[57] ABSTRACT

Apparatus for heating longitudinally extending portions of a blow molding preform in order to provide a non-symmetrical temperature distribution about a longitudinal axis of the preform. The non-symmetrical temperature distribution permits the preform to be blown to form a non-symmetrical article that has an essentially uniform wall thickness distribution. An auxiliary heating and transfer station is provided between a reheating station and a blowing station, the auxiliary heating and transfer station including two side-by-side pairs of heating elements that are adapted to heat sequentially, corresponding sides of each of a pair of side-by-side blow molding preforms carried by a pallet. The two zone auxiliary heating arrangement permits the desired temperature rise to be achieved consistently while retaining some process flexibility. One or more of the heating elements in the second zone of the auxiliary heating and transfer station is mounted in a manner which allows it to be temporarily repositioned out of the preform movement path. In the preferred embodiment a pivotable turntable is used to shift the associated heating element by 90°, thereby permitting transverse movement of the pallet and associated preforms in a direction toward the blow molding station.

13 Claims, 4 Drawing Sheets

APPARATUS FOR HEATING PORTIONS OF CONTAINER PREFORMS

BACKGROUND OF THE INVENTION

1. Field of the Invention

The present invention relates to apparatus for blow molding articles from molded preforms that have been reheated and are subsequently expanded within a blow mold to provide a desired hollow article. More particularly, the present invention relates to apparatus for heating portions of container preforms in a reheat blow molding machine, the apparatus including an auxiliary heating station at which auxiliary heating apparatus is provided for locally heating a longitudinally extending section of a preform to a higher temperature than the remainder of the preform.

2. Description of the Related Art

Blow molding machines are known for expanding a tubular plastic member that is positioned within a mold and subsequently expanded by pressurized air to provide a hollow article that has an outer shape that conforms with the interior surfaces of the mold. Such machines are sometimes single stage or extrusion-type, in which an extruder is provided for directly extruding a hot tubular plastic member, called a "parison," around which a pair of mold halves are closed, with the bottoms of the mold halves defining a "pinch-off." Pressurized air is then introduced through the top of the mold for expanding the parison to form the desired hollow article.

Another type of blow molding is accomplished by a two stage process, generally referred to as reheat-blow (RHB), in which plastic preforms are injection molded in a tubular form that is open at one end and closed at the other. After some time interval (during which cooling occurs), the preforms are received in a loading station, are conveyed to an oven for reheating to a softening temperature, and are then transferred to a blowing station at which the heated preform is positioned within a mold cavity and is subsequently blown by introducing pressurized air into the heated preform to provide the desired blown article.

Most often the tubular parison or preform is heated to a uniform temperature suitable for blowing. However, in instances when the molds define an article having one transverse axis longer than the other, such as a container having an oval cross section, uniform heating of the preform usually results in unequal distribution of the plastic material, with the areas of the preform that have been expanded radially outwardly the largest distance having thinner walls than those areas of the preform that have been expanded smaller distances.

One way to equalize more closely the plastic wall thickness distribution in a blown article is to compensate for the difference in radial expansion distance by making the tubular preform itself of non-uniform wall thickness. This approach has typically been used in single stage blow molding machines utilizing a thoroughly molten parison. In such cases it is fairly simple to compensate for an unsymmetrical configuration for the final product by means of extruding a parison initially which has a variation in thickness around the circumference. However, this approach is not well suited for two stage blow molding machines in which the preform is cooled before the final forming.

An alternate approach for achieving uniform wall thickness in unsymmetrical containers that has been used in two stage machines involves heating selected areas of the surface of the preform to different temperatures, thus permitting differential expansion of the respective portions of the preform. The areas of higher temperature will allow some material to be drawn away to help maintain wall thickness in the areas formed by the lower temperature segments that expand a greater distance. Although such localized heating of preforms is known, the previous approaches to providing that result were of limited effectiveness. In one method, the radiant heaters in an oven are specially configured to have the effect of producing a non-uniform temperature distribution in the preform. However, since these arrangements heat all areas of the preform at the same time (in the same oven), the arrangement of the heaters to produce defined areas of higher temperature consistently is very difficult to establish and is unique for each material selection and container configuration.

Another approach used in two stage blow molding machines involves first heating the entire preform in a conventional manner to a desired elevated temperature. Selective heating is then separately provided by masking or screening a portion of an auxiliary heating element to prevent an increase in temperature for a specific area(s) of the preform. However, this method is inefficient since the power supplied to the heater in the masked portion is wasted. The masking procedure is also labor intensive and is difficult to control since the radiation of heat to the masked areas cannot be completely avoided. Furthermore, this method will sometimes still require a preform having variable wall thickness to achieve satisfactory results in the final blown article.

Accordingly, it is an object of the present invention to overcome the deficiencies in the prior art arrangements, and to provide an improved auxiliary heating system for localized additional heating of blow molding preforms to enable differential expansion.

SUMMARY OF THE INVENTION

Briefly stated, in accordance with one aspect of the present invention, apparatus is provided in a reheat-blow molding machine for heating selected surfaces of a blow molding preform to a higher temperature than that of adjacent surfaces. The apparatus includes a supporting frame and a plurality of container preform carriers for supporting a pair of container preforms in side-by-side relationship along a preform movement path. The preform carriers are supported for movement along the support frame.

The apparatus includes a primary reheat station carried on the supporting frame for uniformly heating container preforms to a desired first temperature to soften the preforms for subsequent blowing. To provide efficient control of localized heating, an auxiliary heating station is provided on the supporting frame and is positioned downstream of the primary heating station. The auxiliary heating station includes heating elements configured and disposed to heat a selected circumferential portion of a preform (without any screening or masking), typically along one longitudinally extending side surface of the preform, to a desired second temperature higher than the first temperature. This heating arrangement provides effective, non-symmetrical localized heating of the preforms, thus enabling expansion of the preform in a non-symmetrical mold cavity to form a final blown container with substantially uniform wall thickness in a transverse plane.

DESCRIPTION OF THE PREFERRED EMBODIMENTS

Reheat-blow molding machines generally include a preform loading station, at which the preforms are presented to the machine and loaded onto preform carriers, and a reheating station, at which the preforms are reheated to a desired temperature for subsequent expansion within a blow mold. The reheating station is generally an enclosed structure, such as an oven, and the reheating is performed so that the preforms are uniformly heated throughout their structure to the desired temperature.

After reheating, the preforms are carried by a suitable conveyor to a blow molding station and are positioned within the blow molds, after which the molds are closed about the preforms and pressurized air is introduced into the interior of the preforms to expand the preforms against the inner surfaces of the blow mold and thereby form the desired hollow articles.

Figure 1:
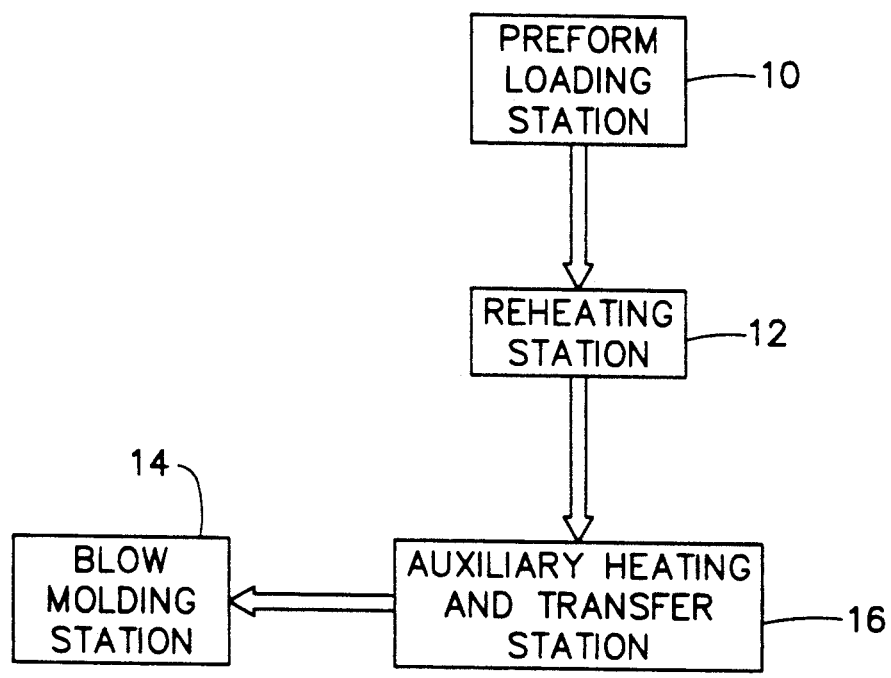
FIG. 1 is a flow chart showing the sequential arrangement of the several stations of a reheat-blow molding machine in accordance with the present invention.

The sequential arrangement of the various operating stations for the blow molding apparatus incorporating the present invention is similar to the prior art devices, and is shown in block diagram form in FIG. 1. As in the prior art machines, a blow molding machine incorporating the present invention includes a preform loading station 10, a reheating station 12, and a blow molding station 14. The additional structure provided in the apparatus in accordance with the present invention is the auxiliary heating and transfer station 16, at which specific localized areas of the preforms are heated to a temperature higher than the temperature to which the preforms had been uniformly heated in reheating station 12. Additionally, the direction of movement of the preforms is also shifted laterally as the preforms exit from the auxiliary heating station to proceed to the blow molding station.

Figure 2:
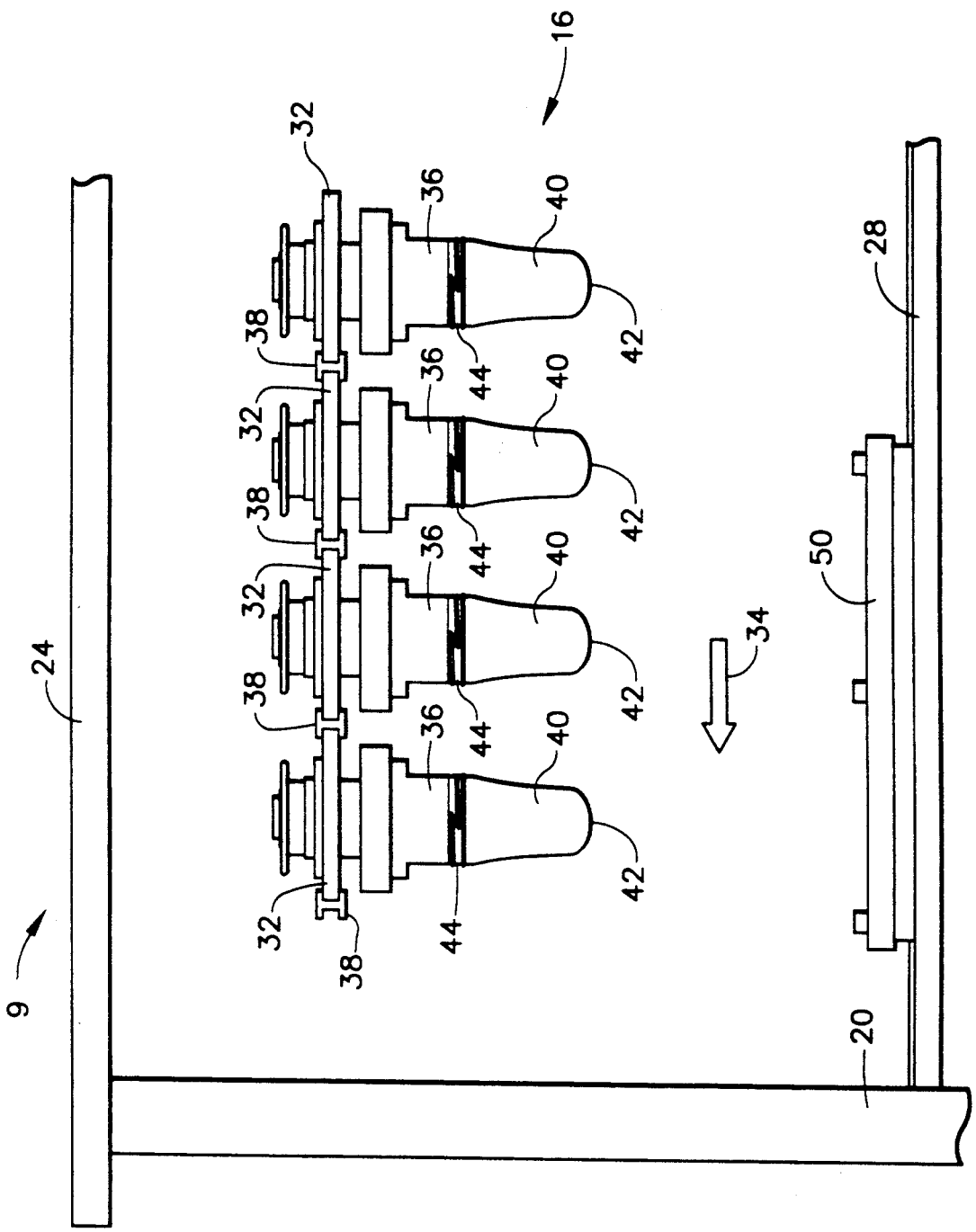
FIG. 2 is a fragmentary side elevational view of a preform auxiliary heating station of a blow molding machine in accordance with the present invention.
Figure 3:
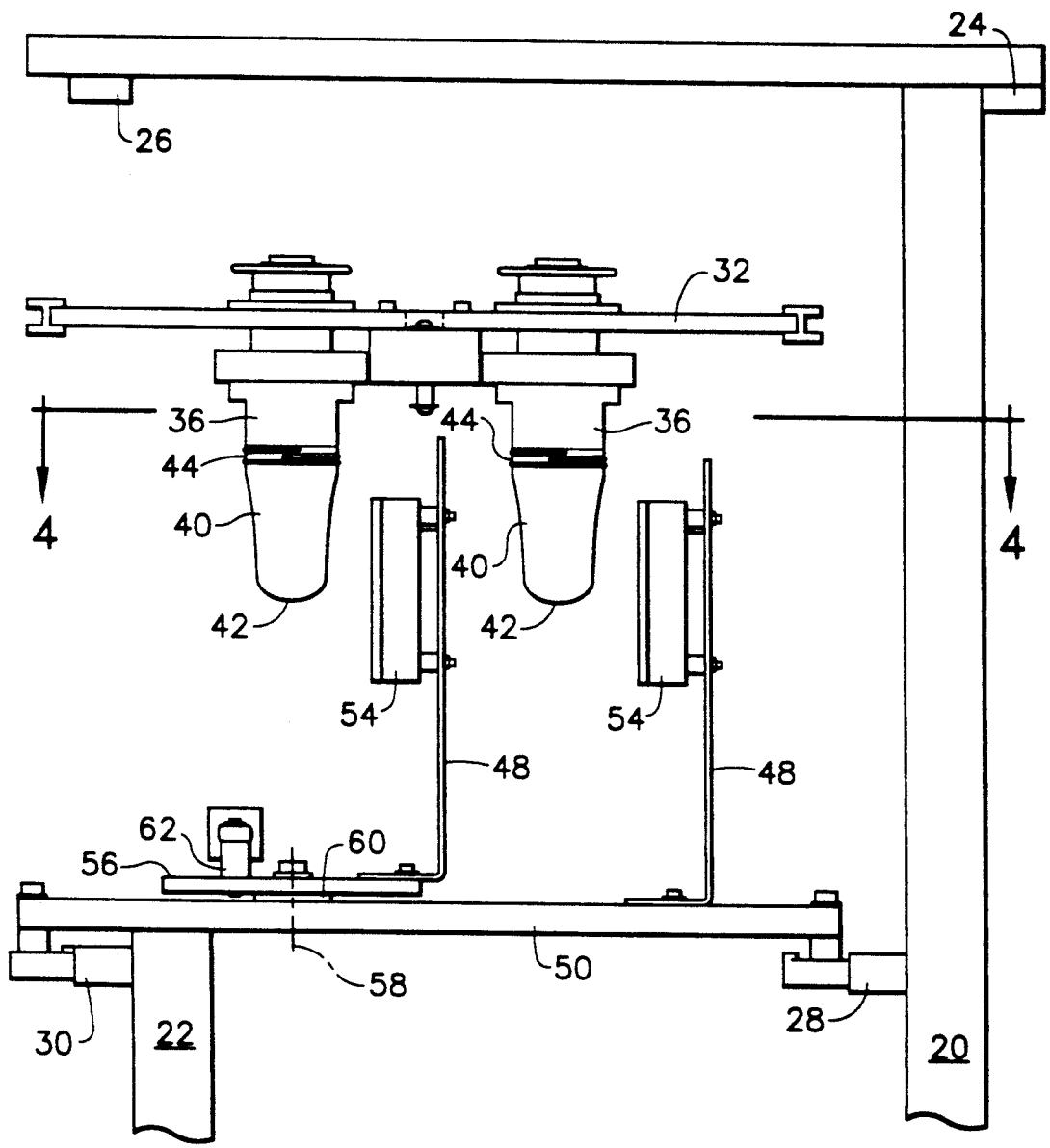
FIG. 3 is a fragmentary end elevational view of the auxiliary heating station shown in FIG. 2, as viewed from the left side of FIG. 2.

Referring now to FIGS. 2 and 3, there is shown an auxiliary heating and transfer station 16 of a blow molding machine 9 in accordance with the present invention. As will be appreciated by those skilled in the art, auxiliary heating and transfer station 16 can be positioned between a preform reheat station (not shown) and a blowing station (not shown) of a known type of reheat blow molding machine. The structure and operation of one form of known reheat blow molding machine is illustrated and described in U.S. Pat. No. 4,382,760, which issued on May 10, 1983, to James G. Wiatt et al., and which is commonly owned by the assignee of the present application. The disclosure of U.S. Pat. No. 4,382,760 is hereby incorporated herein by reference to the same extent as if fully set forth herein.

Blow molding machine 9 includes a plurality of vertical frame members 20, 22, a plurality of upper horizontal frame members 24, 26, and a plurality of lower horizontal frame members 28, 30, all of which are connected together to define a substantially rectangular machine frame to support the several elements and the separate sections of the machine. A plurality of rectangular pallets 32 are provided, each pallet having its longitudinal axis oriented transversely relative to the pallet movement direction indicated by arrow 34 in FIG. 2. The pallets are transported through the machine by a suitable conveyor (not shown), the structure and operation of which are known to those skilled in the art.

Pallets 32 each rotatably carry a pair of side-by-side preform carriers 36, the preform carriers each having their longitudinal axes extending substantially perpendicularly to the pallet movement direction indicated by arrow 34. Adjacent pallets 32 are separated from each other by pallet separators 38 that extend transversely relative to the pallet movement direction 34 and that have an I-shaped cross section, as shown.

Each preform carrier 36 is adapted to carry a tubular preform 40, each such preform preferably including a tubular body having a closed end 42 and an open end defined by a neck 44. The structure of pallets 32 and of preform carriers 36 can be in accordance with the apparatus illustrated and described in U.S. Pat. No. 4,678,425, which issued Jul. 7, 1987, to Joseph F. Gibbemeyer, and which is commonly owned by the assignee of the present application. The disclosure of U.S. Pat. No. 4,678,425 is hereby incorporated herein by reference to the same extent as if fully set forth herein.

Although FIGS. 2 and 3 are each views showing auxiliary heating and transfer station 16, the depiction of the apparatus in FIG. 2 is without the auxiliary heating structure that is shown in FIG. 3, for purposes of clarity of showing of the side view of the structure and preforms.

Figure 4:
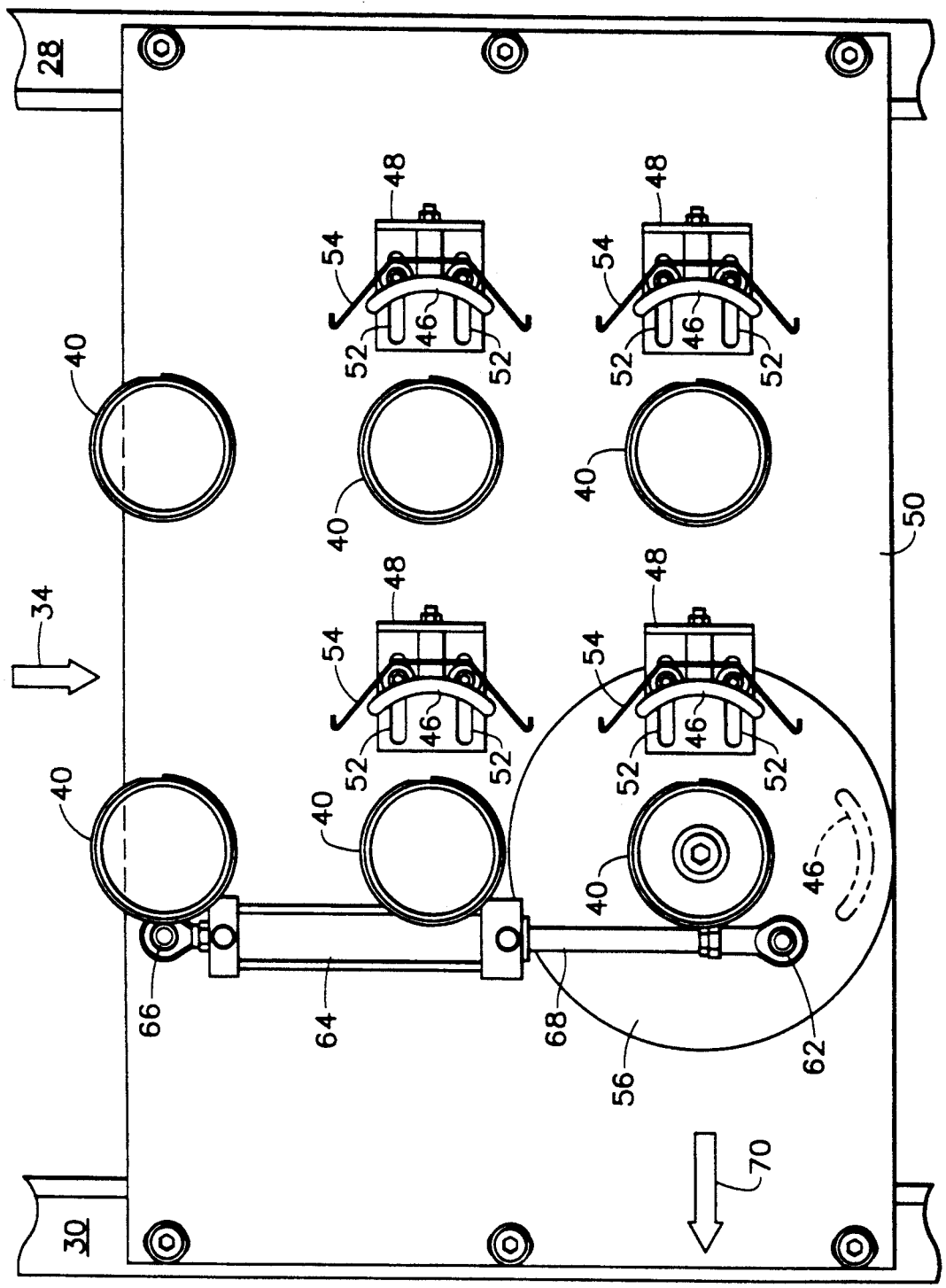
FIG. 4 is a top plan view at the preform transfer station, taken along the line 4—4 of FIG. 3.

Referring now to FIGS. 3 and 4, there is shown in FIG. 3 an end view of auxiliary heating and transfer station 16, showing two preforms and an associated pallet 32 as seen when looking along the path of travel of the pallets, but in a direction opposite from the actual direction of movement of the pallets. FIG. 4 is a top view of auxiliary heating and transfer station 16. As best seen in FIG. 4, station 16 includes two pairs of laterally spaced heating elements 46 that are each so positioned relative to the path of travel of the preform carriers that each heating element is laterally offset from and is opposite a lateral side of one of the side-by-side preforms 40 carried by the respective preform carriers 36 as the preform carriers are transported to and through auxiliary heating and transfer station 16. Heating elements 46 are preferably provided in the form of electrically operated ceramic infrared radiant heaters, however, they can also be strip heaters of the resistance type, or one or more rod-type resistance heating elements with suitable reflectors.

As shown in FIG. 4, heating elements 46 are preferably arcuate in cross section, having concave front surfaces facing an associated preform. Additionally, each heating element 46 has substantially the same transverse cross section at each point along its longitudinal axis. This configuration has proven to provide efficient localized heating of the preforms.

Heating elements 46 are each positioned at transfer and auxiliary heating station 16, relative to a preform 40, so that the portion of associated preform 40 opposite to and facing heating element 46 is uniformly locally heated, both longitudinally and transversely, as required, to a higher temperature than the temperature of the remainder of the preform. Preferably, the curvature of the concave face of each of heating elements 46 is a circular arc having a center of curvature that is substantially coincident with the longitudinal axis of a preform when the preform is positioned at an appropriate distance opposite the respective heating element, in order to space the concave surface of the heating element substantially uniformly from the opposite surface of the preform.

Each of heating elements 46 is carried by an L-shaped heater support bracket 48 that is bolted to a horizontally arranged support plate 50. Heater support brackets 48 include slotted openings 52 at their base portions to enable the brackets to be moved toward and away from the longitudinal axis of a preform 40. In addition, there are vertical slots (not shown) in the upstanding portion of the support brackets 48 to enable vertical adjustment of the heating elements. This lateral and vertical adjustability provides a means of regulating the temperature and the area affected at the surface of the preform opposite from the associated heating element. A generally U-shaped sheet metal heat shield or heat deflector 54 is also carried by each of heater support brackets 48. Each deflector 54 is positioned opposite and substantially parallel with the convex rear surface of the respective heating element to direct the heat from its associated heating element only toward the associated preform 40, and to minimize the quantity of heat from other heating elements impinging on a preform.

The surface area affected and the temperature distribution of the preform are tied together as functions of heater configuration, proximity of the heater to the preform, heater power, and the time the preform is exposed to the auxiliary heat. Accordingly, the respective elements described above can be adjusted as required to achieve precise control of the operating parameters. It should also be noted that in some cases it may be desirable to position more than one heater adjacent each preform to accomplish the necessary localized heating, depending on the final shape of the blown article.

As shown in FIG. 4, auxiliary heating and transfer station 16 includes two pairs of laterally spaced heating elements 46, each heating element adapted to be positioned to face the same side of an associated one of a pair of side-by-side preforms 40 carried by a respective preform-carrying pallet 32. Additionally, each pair of laterally spaced heating elements is spaced from an adjacent transversely spaced pair a distance along the path of travel 34 of the preforms a distance substantially equal to the spacing between the longitudinal axes of successive preforms. Consequently, each of the transversely spaced pairs of heating elements defines a separate auxiliary heating zone, with each of the heating zones adapted to be operable simultaneously to heat a preform, thereby reducing the residence time of a pallet 32 at a particular heating zone as compared with the residence time for only a single heating zone for the same preform temperature rise. Therefore, the necessary pause in movement of the conveyor that transports the pallets and preforms, to permit the preforms to be locally heated t the desired temperature, is minimized by providing two successive auxiliary heating zones for the additional, localized heating of each preform rather than only a single heating zone.

In addition to localized heating of the preforms at auxiliary heating and transfer station 16, the machine configuration requires that the preforms also undergo a lateral shift in movement from the movement direction indicated by arrow 34, in order to permit the pallets with the associated side-by-side preform carriers to be directed transversely toward the blow molding station (not shown) after the localized heating of the preforms to the desired temperature has been effected. Shown in FIG. 4 is a structural arrangement for temporarily repositioning one of heating elements 46 at the second auxiliary heating zone. The heater support bracket 48 for the leftmost heating element 46 at the second auxiliary heating zone is bolted to a heater carrier disk 56 that is positioned above support plate 50 (see FIG. 3) and is supported for pivotal movement about a pivot axis 58 by means of a supporting washer 60. Heater carrier disk 56 includes a connecting pin 62 that is spaced radially outwardly from pivot axis 58. The cylinder 64 of a cylindrical actuator is secured to support plate 50 by a bolt 66, and the free end of a piston rod 68 slidably carried by cylinder 64 is connected to pin 62. Actuation of cylinder by introducing pressurized air or hydraulic fluid permits heater carrier disk 56 to be pivoted about pivot axis 58.

In operation, a succession of pallets 32, each carrying a pair of preforms 40, are transported by a conveyor (not shown) from preform loading station 10, as shown in FIG. 1 to reheating station 12, at which they are uniformly reheated to a desired softening temperature dependent upon the material from which the preform has been formed. After being uniformly reheated to the desired temperature, pallets 32 and their associated preforms 40 are successively transported to auxiliary heating and transfer station 16, to stop at the first auxiliary heating zone to allow the desired area of preforms 40 that face respective heating elements 46 to be heated to a higher temperature.

After a predetermined stopping time to allow the localized temperature to reach the desired level, pallets 32 are again transported, by one pallet width, from the first auxiliary heating zone to the second auxiliary heating zone, at which the temperature of the selected areas of the preforms are raised to the desired final level necessary to enable the subsequent blowing step to be performed, providing the desired uniform material distribution in the blown article. After the preforms have attained the desired local temperature distribution for subsequent blowing into the desired hollow articles, the leftmost heating element, as viewed in FIG. 4, is pivoted clockwise 90° by actuating cylinder 64 connected to heater carrier disk 56, in order to shift heating element 46 carried by disk 56 from the solid line position as shown to the dashed line position shown, in order not to impede lateral leftward movement of the rightmost preform, as viewed in FIG. 4, as the pallet at the second auxiliary heating zone is shifted in the direction indicated by arrow 70. The pallet is then conveyed laterally toward blow molding station 14, at which the preforms are placed within respective blow molds (not shown) and are expanded to form the desired articles.

It can thus be seen that the present invention provides distinct advantages over the previously-disclosed structures in that it permits close control over the heating of particular circumferential areas of preforms, and does so with elements that do not require excessive set-up time while still providing the desired process flexibility.

Although particular embodiments of the present invention have been illustrated and described, it will be apparent to those skilled in the art that various changes and modifications can be made without departing from the spirit of the present invention. For example, as an alternative to using a rotary turntable for temporarily repositioning a heating element to allow lateral movement of the preforms, a mechanism could be included in the structure of the auxiliary heating station to shift one or more heating elements vertically out of the path of movement for the preforms. It is therefore intended to encompass within the appended claims all such changes and modifications that fall within the scope of the present invention.

What is claimed is:

1. Apparatus for heating selected surfaces of a blow molding preform to a higher temperature than adjacent surfaces, said apparatus comprising:
   a. a supporting frame;
   a plurality of pallets, each of the pallets supporting a pair of container preforms in side-by-side relationship and conveying the container preforms along a preform movement path which includes a lateral shift, the pallets being supported for movement along the supporting frame;
   c. a reheat station carried by the supporting frame for uniformly heating container preforms from ambient temperature to a desired first elevated temperature to soften the preforms for later blowing in a blow mold;
   d. an auxiliary heating station carried by the supporting frame, downstream from and adjacent the reheat station, the auxiliary heating station including a plurality of heating elements adjustably positioned and geometrically configured to heat a selected circumferential area of the preforms to a desired second elevated temperature greater than the desired first elevated temperature to provide a non-symmetrical circumferential temperature distribution within the preform, at least one heating element in the auxiliary heating station being movable to a position out of the preform movement path; and
   e. a blowing station carried by the supporting frame, downstream from and adjacent the auxiliary heating station, for introducing pressurized air into the preforms while the preforms are within a non-symmetrical mold cavity to expand the preforms to conform with the walls of the cavity, the temperature distribution in the preform allowing expansion of the preform within the mold cavity to provide a blown article with substantially uniform wall thickness in a transverse plane.

2. Apparatus in accordance with claim 1 wherein the heating elements have a major axis substantially parallel with a longitudinal axis of the preforms ad have an arcuate cross section defining an arc-shaped structure including a concave face, the heating elements positioned with their concave faces spaced from and opposite to a portion of the outer surface of a preform.

3. Apparatus in accordance with claim 2 including reflectors positioned adjacent the respective heating elements to prevent heat associated with one preform from heating an adjacent preform.

4. Apparatus in accordance with claim 1 wherein the auxiliary heating station includes a first heating zone including a first set of heating elements and a second heating zone including a second set of heating elements, to heat the preform to the second temperature in two successive auxiliary heating steps.

5. Apparatus in accordance with claim 4 wherein the second heating zone includes a first, fixed heating element and a second, movable heating element.

6. Apparatus in accordance with claim 5 wherein the movable heating element is pivotable about a pivot axis spaced from the movable heating element to permit the movable heating element to be pivoted from a first position to a second position to enable a preform to be carried to pass through the first position.

7. Apparatus in accordance with claim 6 wherein the movable heating element is carried on a turntable pivotable about a turntable pivot axis, the movable heating element positioned on the turntable at a point spaced from the turntable pivot axis.

8. Apparatus in accordance with claim 7 including an actuator extending between the frame and the turntable and connected with the turntable at a second point spaced from the turntable pivot axis and from the movable heating element for pivoting the turntable.

9. Apparatus for heating selected surfaces of a blow molding preform to a higher temperature than adjacent surfaces, said apparatus comprising:
   a. a supporting frame;
   b. a plurality of pallets, each of the pallets supporting a pair of container preforms in side-by-side relationship and conveying the container preforms along a preform movement path which includes a lateral shift, the pallets being supported for movement along the supporting frame;
   c. a reheat station carried by the supporting frame for uniformly heating container preforms from ambient temperature to a desired first elevated temperature to soften the preforms for later blowing in a blow mold;
   d. an auxiliary heating station carried by the supporting frame, downstream from and adjacent the reheat station, the auxiliary heating station including two pairs of laterally spaced auxiliary heating elements to define first and second auxiliary heating zones to heat a selected circumferential area of the preform to a desired second elevated temperature grater than the desired first elevated temperature to provide a non-symmetrical circumferential temperature distribution within the preform, the second auxiliary heating zone including a second auxiliary heater that is movable to a position out of the path of movement of a respective preform; and
   e. a blowing station carried by the supporting frame, downstream from and adjacent the auxiliary heating station, for introducing pressurized air into the preforms while the preforms are within a non-symmetrical mold cavity to expand the preforms to conform with the walls of the cavity, the temperature distribution in the preform allowing expansion of the preform within the mold cavity to provide a blown article with substantially uniform wall thickness in a transverse plane.

10. Apparatus in accordance with claim 9 wherein the second auxiliary heater is carried on a turntable that is pivotable about a turntable pivot axis.

11. Apparatus in accordance with claim 10 wherein the second auxiliary heater is positioned on the turntable at a point that is offset from the turntable pivot axis.

12. Apparatus in accordance with claim 10 including a pressurized-fluid-operated actuator for pivoting the turntable about the turntable pivot axis.

13. Apparatus in accordance with claim 9 wherein the auxiliary heating elements are positioned on the same sides of respective preforms to heat sequentially the sides of each of the preforms to a desired temperature after initial reheating and prior to blowing.

* * * * *